US012561756B2

(12) United States Patent　　　　　(10) Patent No.:　US 12,561,756 B2
　　　Liu　　　　　　　　　　　　　　　　(45) Date of Patent:　　Feb. 24, 2026

(54) SUPER-RESOLUTION IMAGE PROCESSING

(71) Applicant: BOE TECHNOLOGY GROUP CO., LTD., Beijing (CN)

(72) Inventor: Hanwen Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 294 days.

(21) Appl. No.: 18/273,026

(22) PCT Filed: Oct. 29, 2021

(86) PCT No.: PCT/CN2021/127282
§ 371 (c)(1),
(2) Date: Jul. 18, 2023

(87) PCT Pub. No.: WO2023/070495
PCT Pub. Date: May 4, 2023

(65) Prior Publication Data
US 2024/0087085 A1　　　Mar. 14, 2024

(51) Int. Cl.
G06T 3/4053　　　　(2024.01)
G06T 7/11　　　　　(2017.01)
G06T 7/174　　　　(2017.01)

(52) U.S. Cl.
CPC ............. G06T 3/4053 (2013.01); G06T 7/11 (2017.01); G06T 7/174 (2017.01); *G06T 2207/20081* (2013.01); *G06T 2207/20221* (2013.01)

(58) Field of Classification Search
CPC ........ G06N 3/0464; G06N 3/048; G06N 3/08; G06T 2207/20081; G06T 2207/20221; G06T 3/4046; G06T 3/4053; G06T 7/11; G06T 7/174
See application file for complete search history.

(56) References Cited

U.S. PATENT DOCUMENTS

| | | | |
|---|---|---|---|
| 2022/0122224 A1* | 4/2022 | Perazzi | ..................... G06T 5/70 |
| 2023/0132180 A1* | 4/2023 | Hsieh | ........................ G06T 7/11 |
| | | | 382/299 |

* cited by examiner

*Primary Examiner* — Kenny A Cese
(74) *Attorney, Agent, or Firm* — HOUTTEMAN LAW LLC

(57)　　　　　　　ABSTRACT

The present disclosure provides an image processing method, including: down-sampling an original image according to a preset resolution to generate a down-sampled image; extracting a target object region from the down-sampled image to obtain a first target object mask; inputting the downsampled image and the first target object mask into a mask super-resolution model obtained in advance by training; performing super-resolution processing on the first target object mask by using the mask super-resolution model to obtain a second target object mask; and fusing the second target object mask with the original image to obtain a target object image. The present disclosure further provides an electronic device and a non-transitory computer readable medium.

11 Claims, 5 Drawing Sheets inputting the downsampled image sample and the target object mask sample corresponding to the downsampled image sample into the mask super-resolution model to be trained — S01 training the mask super-resolution model to be trained based on the downsampled image sample and the target object mask sample in an iterative manner — S02 ending, in response to that a preset convergence condition is satisfied, the training and obtaining the mask super-resolution model — S03

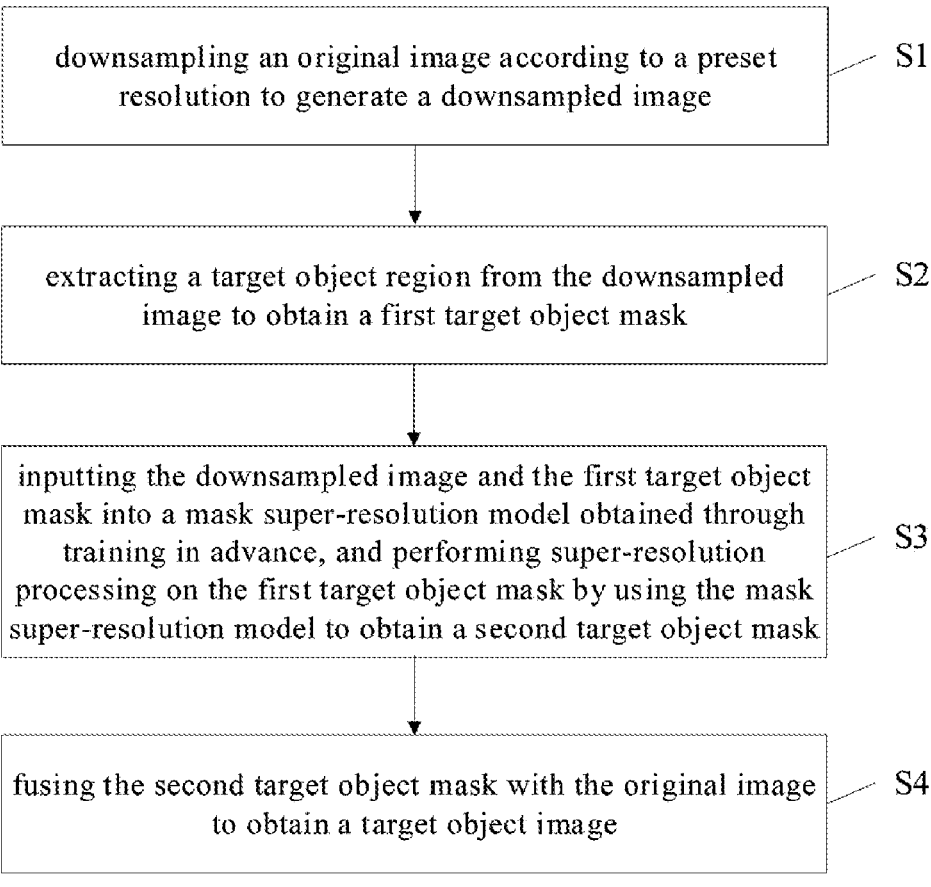

downsampling an original image according to a preset resolution to generate a downsampled image — S1 extracting a target object region from the downsampled image to obtain a first target object mask — S2 inputting the downsampled image and the first target object mask into a mask super-resolution model obtained through training in advance, and performing super-resolution processing on the first target object mask by using the mask super-resolution model to obtain a second target object mask — S3 fusing the second target object mask with the original image to obtain a target object image — S4

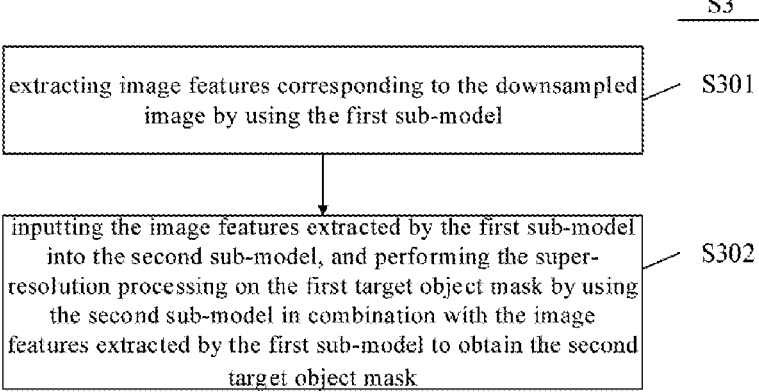

extracting image features corresponding to the downsampled image by using the first sub-model — S301 inputting the image features extracted by the first sub-model into the second sub-model, and performing the super-resolution processing on the first target object mask by using the second sub-model in combination with the image features extracted by the first sub-model to obtain the second target object mask — S302

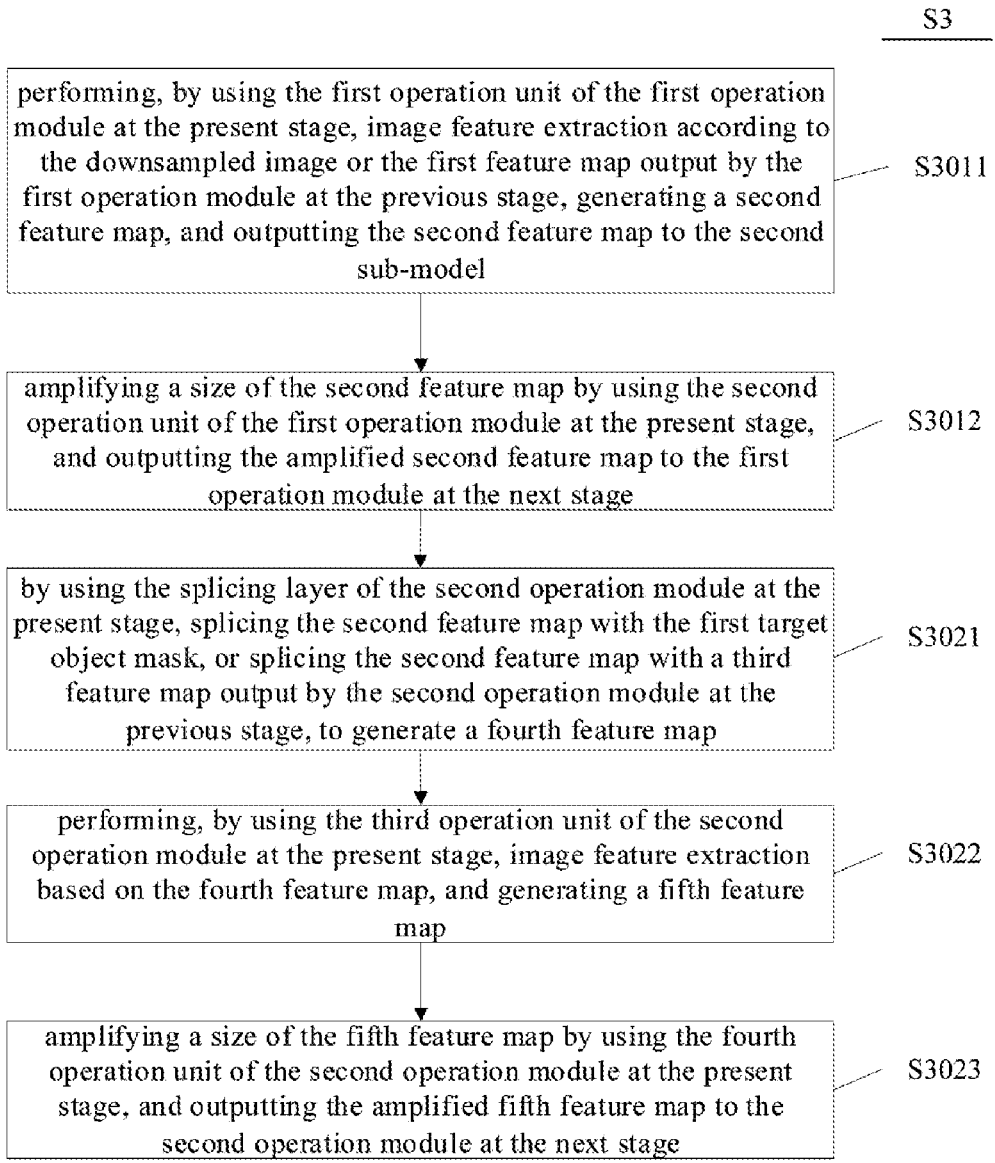

performing, by using the first operation unit of the first operation module at the present stage, image feature extraction according to the downsampled image or the first feature map output by the first operation module at the previous stage, generating a second feature map, and outputting the second feature map to the second sub-model

S3011 amplifying a size of the second feature map by using the second operation unit of the first operation module at the present stage, and outputting the amplified second feature map to the first operation module at the next stage

S3012 by using the splicing layer of the second operation module at the present stage, splicing the second feature map with the first target object mask, or splicing the second feature map with a third feature map output by the second operation module at the previous stage, to generate a fourth feature map

S3021 performing, by using the third operation unit of the second operation module at the present stage, image feature extraction based on the fourth feature map, and generating a fifth feature map

S3022 amplifying a size of the fifth feature map by using the fourth operation unit of the second operation module at the present stage, and outputting the amplified fifth feature map to the second operation module at the next stage

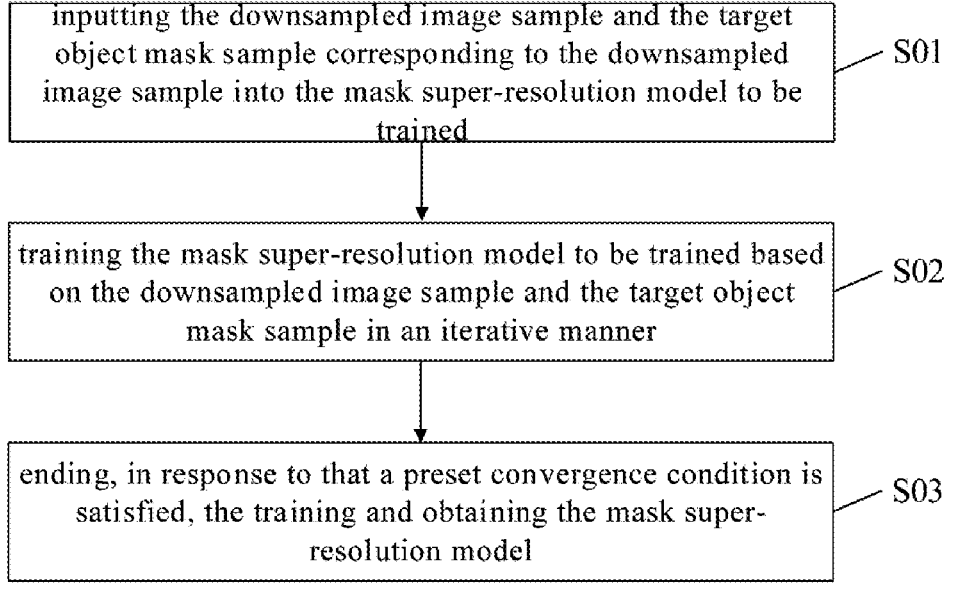

inputting the downsampled image sample and the target object mask sample corresponding to the downsampled image sample into the mask super-resolution model to be trained — S01 training the mask super-resolution model to be trained based on the downsampled image sample and the target object mask sample in an iterative manner — S02 ending, in response to that a preset convergence condition is satisfied, the training and obtaining the mask super-resolution model — S03

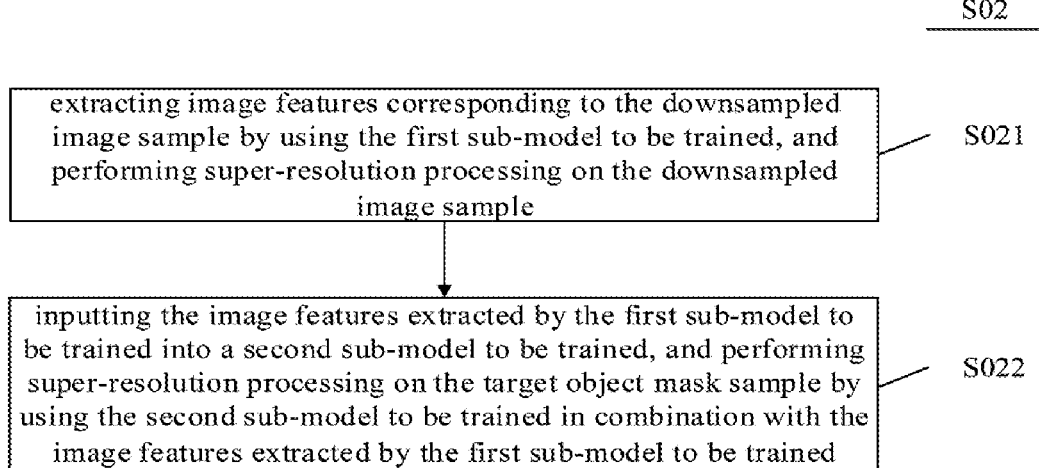

extracting image features corresponding to the downsampled image sample by using the first sub-model to be trained, and performing super-resolution processing on the downsampled image sample — S021 inputting the image features extracted by the first sub-model to be trained into a second sub-model to be trained, and performing super-resolution processing on the target object mask sample by using the second sub-model to be trained in combination with the image features extracted by the first sub-model to be trained — S022

Fig. 5

S2 inputting the downsampled image into a target object extraction model obtained in advance by training, and extracting the target object region from the downsampled image by using the target object extraction model to obtain a first target object mask

S201 computer readable medium

SUPER-RESOLUTION IMAGE PROCESSING

TECHNICAL FIELD

The present disclosure relates to the field of image processing technologies, and in particular, to an image processing method, an electronic device, and a non-transitory computer readable medium.

BACKGROUND

The existing target detection and extraction algorithm based on the neural network model has achieved good effects, and is widely applied to processing of various images such as natural images and medical images. However, the current neural network model has low processing precision, and when extracting and matting a target object, for a relatively large image, there is often a problem that sawteeth or the like occurs at the edge of the image processed.

SUMMARY

The present disclosure is directed to solve at least one of technical problems of the related art and provides an image processing method, an electronic device, and a non-transitory computer readable medium.

To achieve the above object, in a first aspect, an embodiment of the present disclosure provides an image processing method, including:

downsampling an original image according to a preset resolution to generate a downsampled image;

extracting a target object region from the downsampled image to obtain a first target object mask;

inputting the downsampled image and the first target object mask into a mask super-resolution model obtained in advance by training; performing super-resolution processing on the first target object mask by using the mask super-resolution model to obtain a second target object mask, where a resolution of the second target object mask is higher than that of the first target object mask; and fusing the second target object mask with the original image to obtain a target object image.

In some implementations, the mask super-resolution model includes a first sub-model and a second sub-model;

the performing super-resolution processing on the first target object mask by using the mask super-resolution model to obtain a second target object mask includes:

extracting image features corresponding to the downsampled image by using the first sub-model;

inputting the image features extracted by the first sub-model into the second sub-model; and performing the super-resolution processing on the first target object mask by using the second sub-model in combination with the image features extracted by the first sub-model to obtain the second target object mask.

In some implementations, the first sub-model includes first operation modules, at P stages, connected in sequence, the first operation module at each stage includes a first operation unit and a second operation unit, where P is a positive integer greater than 1;

the extracting the image features corresponding to the downsampled image by using the first sub-model includes:

for the first operation module at an $n^{th}$ stage, n being a positive integer and not greater than P, extracting, by using the first operation unit, the image features according to the downsampled image or a first feature map output by the first operation module at the previous stage to generate a second feature map, and outputting the second feature map to the second sub-model; amplifying a size of the second feature map by using the second operation unit of the first operation module at the $n^{th}$ stage, and outputting the amplified second feature map to the first operation module at the next stage;

the performing the super-resolution processing on the first target object mask by using the second sub-model in combination with the image features extracted by the first sub-model to obtain the second target object mask includes:

performing the super-resolution processing on the first target object mask by using the second sub-model in combination with the second feature map extracted by the first operation module at each stage to obtain the second target object mask.

In some implementations, the first operation unit includes a convolutional layer, a batch normalization layer, and an activating layer connected in sequence, and the second operation unit includes a transpose convolutional layer.

In some implementations, the second sub-model includes second operation modules, at P stages, connected in sequence, the second operation module at each stage includes a splicing layer, a third operation unit and a fourth operation unit, where the first operation unit and the third operation unit at the same stage are connected through the splicing layer;

the performing the super-resolution processing on the first target object mask by using the second sub-model in combination with the second feature map extracted by the first operation module at each stage to obtain the second target object mask includes:

for the second operation module at an $m^{th}$ stage, m being a positive integer and not greater than P, by using the splicing layer of the second operation module at the $m^{th}$ stage, splicing the second feature map with the first target object mask, or splicing the second feature map with a third feature map output by the second operation module at the previous stage, to generate a fourth feature map; extracting, by using the third operation unit of the second operation module at the $m^{th}$ stage, the image features according to the fourth feature map to generate a fifth feature map; amplifying a size of the fifth feature map by using the fourth operation unit of the second operation module at the $m^{th}$ stage, and outputting the amplified fifth feature map to the second operation module at the next stage;

where, for the second operation module at the last stage, the second operation module at the last stage outputs the amplified fifth feature map as the second target object mask.

In some implementations, the third operation unit includes a convolutional layer, a batch normalization layer, and an activating layer connected in sequence, and the fourth operation unit includes a transpose convolutional layer.

In some implementations, the extracting the target object region from the downsampled image to obtain the first target object mask includes:

inputting the downsampled image into a target object extraction model obtained in advance by training, and extracting the target object region from the downsampled image by using the target object extraction model to obtain the first target object mask,

where, the target object extraction model is a UNet network model, the first sub-model includes first operation modules, at three stages, connected in sequence, and the second sub-model includes second operation modules, at three stages, connected in sequence.

In some implementations, the mask super-resolution model is trained by:

inputting a downsampled image sample and a target object mask sample corresponding to the downsampled image sample into the mask super-resolution model to be trained;

training the mask super-resolution model to be trained based on the downsampled image sample and the target object mask sample in an iterative manner, through: extracting image features corresponding to the downsampled image sample by using the first sub-model to be trained, and performing super-resolution processing on the downsampled image sample; inputting the image features extracted by the first sub-model to be trained into the second sub-model to be trained; and performing super-resolution processing on the target object mask sample by using the second sub-model to be trained in combination with the image features extracted by the first sub-model to be trained; and ending, in response to that a preset convergence condition is satisfied, the training and obtaining the mask super-resolution model.

In some implementations, the preset convergence condition includes at least one of:

the training having been performed for preset iteration times; or a first loss value and a second loss value meeting a preset loss value condition, where the first loss value is calculated and obtained based on an original image sample corresponding to the downsampled image sample and the downsampled image sample subjected to the super-resolution processing, and the second loss value is calculated and obtained based on the original image sample and the target object mask sample subjected to the super-resolution processing.

In some implementations, the image processing method further includes: after the extracting image features corresponding to the downsampled image sample by using the first sub-model to be trained, and performing super-resolution processing on the downsampled image sample, calculating to obtain the first loss value according to the original image sample and the downsampled image sample subjected to the super-resolution processing based on a Mean Square Error function.

In some implementations, the image processing method further includes: after the performing super-resolution processing on the target object mask sample by using the second sub-model to be trained in combination with the image features extracted by the first sub-model to be trained, acquiring a first edge map corresponding to the original image sample;

performing an edge detection on the target object mask sample subjected to the super-resolution processing to obtain a second edge map; and performing edge matching on the first edge map and the second edge map, and determining the second loss value according to a result of the edge matching.

In some implementations, the target object region is a portrait region, and the target object image is a portrait image.

In a second aspect, an embodiment of the present disclosure further provides an electronic device, including:

at least one processor;

a memory configured to store at least one program, where the at least one program, when executed by the at least one processor, causes the at least one processor to implement the image processing method described above.

In a third aspect, an embodiment of the present disclosure further provides a non-transitory computer readable medium, on which a computer program is stored, where the computer program, when executed by a processor, causes the processor to implement the image processing method described above.

BRIEF DESCRIPTION OF DRAWINGS

The accompanying drawings, which are included to provide a further understanding of the present disclosure and are incorporated in and constitute a part of this specification, illustrate embodiments of the present disclosure and together with the description serve to explain the principles of the present disclosure and not to limit the present disclosure. The above and other features and advantages will become more apparent to those skilled in the art by describing exemplary embodiments in detail with reference to the accompanying drawings, in which:

FIG. 1 is a flowchart of an image processing method according to an embodiment of the present disclosure;

FIG. 2 is a flowchart illustrating a specific implementation of a step S3 according to an embodiment of the present disclosure;

FIG. 3 is a flowchart of another specific implementation of a step S3 according to an embodiment of the present disclosure;

FIG. 4 is a flowchart of a method for training a mask super-resolution model according to an embodiment of the present disclosure;

FIG. 5 is a flowchart illustrating a specific implementation of a step S02 according to an embodiment of the present disclosure;

DETAIL DESCRIPTION OF EMBODIMENTS

Figure 6:
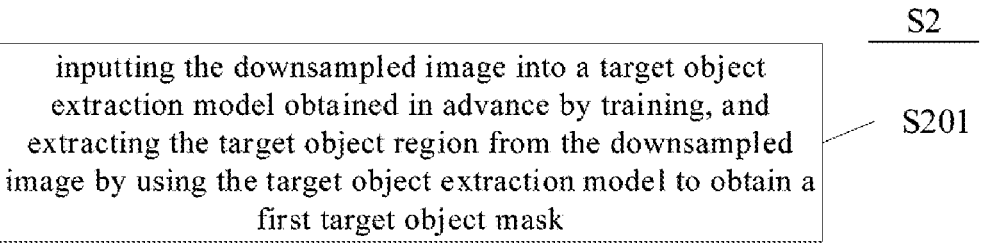
FIG. 6 is a flowchart illustrating a specific implementation of a step S2 according to an embodiment of the present disclosure.

In order to make those skilled in the art better understand the technical solution of the present disclosure, an image processing method, an electronic device, and a non-transitory computer readable medium provided in the present disclosure are described in detail below with reference to the accompanying drawings.

Example embodiments will be described more fully hereinafter with reference to the accompanying drawings, but may be embodied in different forms and should not be construed as limited to the embodiments set forth herein. Rather, these embodiments are provided so that the present disclosure will be thorough and complete, and will fully convey the scope of the present disclosure to those skilled in the art.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the use of the terms "comprises/includes" and/or "comprising/including" in the present specification indicates the presentence of the following features, integers, steps, operations, elements, and/or components, but do not exclude the presence or addition of one or more other features, integers, steps, operations, elements, components, and/or groups thereof.

It will be understood that, although the terms of first, second and the like may be used herein to describe various elements, these elements should not be limited by these terms. These terms are only used to distinguish one element from another. Thus, a first element, a first component, or a first module discussed below could be referred to as a second element, a second component, or a second module without departing from the teachings of the present disclosure.

Unless otherwise defined, all terms (including technical and scientific terms) used herein have the same meaning as commonly understood by those skilled in the art. It will be further understood that terms, such as those defined in commonly used dictionaries, should be interpreted as having a meaning that is consistent with their meaning in the context of the related art and the present disclosure, and will not be interpreted in an idealized or overly formal sense unless expressly so defined herein.

FIG. 1 is a flowchart of an image processing method according to an embodiment of the present disclosure. As shown in FIG. 1, the image processing method includes following steps S1 to S4.

At step S1, downsampling an original image according to a preset resolution to generate a downsampled image.

The preset resolution is smaller than a resolution of the original image; the downsampling the original image corresponds to a process of scaling the original image, to generate the downsampled image with a lower resolution, where the resolution of the downsampled image is the preset resolution, the number of pixel points of the downsampled image is smaller than that of the original image, the time consumption for performing corresponding operation and processing on the downsampled image is accordingly reduced by a ratio that may be approximate to a ratio of the preset resolution to the resolution of the original image.

At step S2, extracting a target object region from the downsampled image to obtain a first target object mask.

The mask is a single-channel image and may be used for shielding all or part of an image to be processed in an image processing process, so as to control an object region, a process and the like of the image processing; in this embodiment, the first target object mask is a mask corresponding to the extracted target object region, where the target object region serves as a foreground region of the downsampled image, and the other portion serves as a background region of the downsampled image, and if the first target object mask is applied to the downsampled image, a downsampled image in which only the foreground region is retained can be obtained; in some implementations, the mask is a binary image consisting of 0 and 1, or in some implementations, the mask may be a multivalued image.

In some implementations, the target object region is a portrait region, and the target object image is a portrait image, the step S2 corresponds to a process of portrait matting. It should be noted that a portrait serving as a target object is only one specific implementation provided by the embodiment of the present disclosure, which does not limit the technical solution of the present disclosure, and other types of target objects, such as animals and plants, cars and other vehicles, license plates, and the like, are also applicable to the technical solution of the present disclosure. Specifically, the target object of the corresponding type is desired to meet at least one of the following conditions: having a specific shape; having a clearer profile; a position of a region to which it belongs in the image can be determined by means of a corresponding detection algorithm.

At step S3, inputting the downsampled image and the first target object mask into a mask super-resolution model obtained through training in advance, and performing super-resolution processing on the first target object mask by using the mask super-resolution model to obtain a second target object mask.

A resolution of the second target object mask is higher than the resolution of the first target object mask; in the step S3, the mask super-resolution model is used to perform the super-resolution processing on the first target object mask in combination with the downsampled image, where the super-resolution processing (SR) corresponds to a process of reconstructing an image with a higher resolution based on an image with a lower resolution.

In some implementations, the mask super-resolution model is obtained in advance by training based on an original image sample, a downsampled image sample and a target object mask sample.

At step S4, fusing the second target object mask with the original image to obtain a target object image.

The target object image is the final matting result for the target object from the original image. In some implementations, the second target object mask is a binary image, and the second target object mask and the original image are fused by multiplication; alternatively, in some implementations, as mentioned above, the second target object mask is a single-channel image, and the second target object mask and the original image may be fused by way of channel fusion; alternatively, in some implementations, the second target object mask and the original image are fused by means of poisson fusion.

The embodiment of the present disclosure provides the image processing method, which is applicable for extracting a target object region from a downsampled image of an original image to obtain a first target object mask; inputting the downsampled image and the first target object mask into a mask super-resolution model, and performing a super-resolution processing on the first target object mask by using the mask super-resolution model to obtain a second target object mask; fusing the second target object mask and the original image to obtain a target object image; therefore, by improving the resolution of the mask corresponding to the object, an overall fineness of the process of extracting the object is improved, and the problem that sawteeth appears at the edge of the image with a relatively large size and a relatively high resolution when the image is subjected to object extraction and image matting can be effectively avoided.

FIG. 2 is a flowchart illustrating a specific implementation of the step S3 according to an embodiment of the present disclosure. Specifically, the mask super-resolution model includes a first sub-model and a second sub-model; as shown in FIG. 2, in the step S3, the performing super-resolution processing on the first target object mask by using the mask super-resolution model to obtain a second target object mask includes: a step S301 and a step S302.

At step S301, extracting image features corresponding to the downsampled image by using the first sub-model.

At step S302, inputting the image features extracted by the first sub-model into the second sub-model, and performing the super-resolution processing on the first target object mask by using the second sub-model in combination with the image features extracted by the first sub-model to obtain the second target object mask.

During the process of performing the super-resolution processing on the first target object mask by using the mask super-resolution model, the downsampled image and the first target object mask are respectively input into the first sub-model and the second sub-model; the first sub-model is configured to extract the image features of the downsampled image and output the image features to the second sub-model, and in some implementations, the first sub-model may also output the downsampled image subjected to the super-resolution processing as an output result, and the output result may be used for calibrating the input and output of the model, detecting the super-resolution effect, and the like; the second sub-model is configured to perform the super-resolution processing on the first target object mask in combination with the image features extracted by the first sub-model, and finally output the second target object mask, in some implementations, feature maps may be spliced by a splicing layer (Concat), and in some implementations, feature fusion may be implemented through 1*1 convolution and pooling of channel latitudes, so as to perform the super-resolution processing on the first target object mask in combination with the image features extracted by the first sub-model.

FIG. 3 is a flowchart of another specific implementation of the step S3 according to an embodiment of the present disclosure. In particular, the implementation shown in FIG. 3 is an alternative of the implementation shown in FIG. 2, and on the basis, the first sub-model includes first operation modules, at P stages, connected in sequence, the first operation module at each stage includes a first operation unit and a second operation unit, where P is a positive integer greater than 1; as shown in FIG. 3, when the step S301 of extracting the image features corresponding to the downsampled image by using the first sub-model is performed, for the first operation module at an $n^{th}$ stage (n is a positive integer and is not greater than P), the step includes: a step S3011 and a step S3012.

At step S3011, performing, by using the first operation unit of the first operation module at the present stage, image feature extraction according to the downsampled image or the first feature map output by the first operation module at the previous stage, generating a second feature map, and outputting the second feature map to the second sub-model.

In the implementation, the first operation modules at multiple stages are used to perform image feature extraction on the downsampled image for multiple times in a hierarchical mode; specifically, when n=1, for the first operation module at the first stage, the first operation unit of the first operation module at the first stage is used to directly extract the image features of the downsampled image; when n is greater than 1, the first operation unit of the first operation module at the corresponding present stage is used to perform the image feature extraction on the first feature map output by the first operation module at the previous stage; specifically, based on the above-mentioned multiple image feature extraction processes, the image features corresponding to the downsampled image include: the image features of the downsampled image and the image features of the feature map corresponding to the downsampled image.

At step S3012, amplifying a size of the second feature map by using the second operation unit of the first operation module at the present stage, and outputting the amplified second feature map to the first operation module at the next stage.

The second feature map output by the first operation module at the present stage serves as the first feature map to be received by the first operation module at the next stage. In some implementations, for the first operation module at the last stage, the amplified feature map output by the first operation module at the last stage is the downsampled image subjected to the super-resolution processing.

In some implementations, the first operation unit includes a convolutional layer, a batch normalization layer and an activating layer connected in sequence, and the second operation unit includes a transpose convolutional layer, also called a deconvolutional layer or an inverse convolutional layer. The amplifying a size of the second feature map by using the second operation unit of the first operation module at the present stage in the step S3012 specifically includes: performing a transpose convolution processing on the feature map corresponding to the extracted image features by using the second operation unit of the first operation module at the present stage, so as to amplify the size of the feature map.

In some implementations, a parameter of each of the convolutional layer, the batch normalization layer, the activating layer and the transpose convolutional layer may be different or varied for the first operation modules at different stages.

Specifically, in correspondence with the operation processing procedure of each layer described above, in the embodiment of the present disclosure, the term "convolution kernel" refers to a two-dimensional matrix used in the convolution procedure. In some implementations, each of entries in the two-dimensional matrix has a particular value.

In the embodiment of the present disclosure, the term of "convolution" refers to the process of processing an image. The convolution kernel is used for convolution. Each pixel of the input image has a value and the convolution kernel starts at one pixel of the input image and moves sequentially over every pixels in the input image. At each position at which the convolution kernel is located, the convolution kernel overlaps several pixels of the image based on the dimension of the convolution kernel. At the position at which the convolution kernel is located, the value of each pixel of the several pixels overlapped with the convolution kernel is multiplied by a corresponding value of the convolution kernel to obtain a multiplied value of the pixel overlapped with the convolution kernel. Subsequently, all multiplied values of the pixels overlapped with the convolution kernel are added up to obtain a sum corresponding to the position of the convolution kernel on the input image. All sums corresponding to all positions of the convolution kernel are collected and output by moving the convolution kernel on every the pixels of the input image, to form an output image. In some implementations, different convolution kernels may be used to extract different features of the input image in the convolution. In some implementations, the convolution process may use different convolution kernels, so as to add more features into the input image.

The convolutional layer is used to perform convolution on the input image to obtain the output image. In some implementations, different convolution kernels are used to perform different convolutions on the same input image. In some implementations, different convolution kernels are used to perform the convolution on different portions of the same input image. Alternatively, different convolution kernels are used to perform convolutions on different input images, for example, multiple images are input in the convolutional layer, and convolutions are performed on the multiple images by using corresponding convolution kernels. Alternatively, different convolution kernels are used depending on different conditions of the input images.

The activating layer may perform nonlinear mapping on output signals output from the convolutional layer. Various functions may be used in the activating layer. Examples of the functions suitable to be used in the activating layer include, but are not limited to: a rectifying linear unit (ReLU) function, a sigmoid function, and a hyperbolic tangent function (e.g., tanh function). In some implementations, the activating layer and the batch normalization layer are included in the convolutional layer.

The batch normalization layer (BN) may perform normalization processing on outputs of layers of the network model for a small batch of data, where the normalization processing is a process of making the data conform to the standard normal distribution in which a mean value of the data is 0 and a standard deviation is 1, which can solve the problem of disappearance of gradients in the neural network model.

Specifically, based on the step S3011 and step S302, the step of performing the super-resolution processing on the first target object mask by using the second sub-model in combination with the image features extracted by the first sub-model to obtain a second target object mask includes: performing the super-resolution processing on the first target object mask by using the second sub-model in combination with the second feature map extracted by the first operation module at each stage, to obtain the second target object mask.

In some implementations, the second sub-model includes second operation modules, at P stages, connected in sequence, the second operation module at each stage includes a splicing layer, a third operation unit and a fourth operation unit, where P is a positive integer greater than 1, and the first operation unit and the third operation unit at the same stage are connected by the splicing layer; therefore, in some implementations, as shown in FIG. 3, when performing the above step of performing the super-resolution processing on the first target object mask by using the second sub-model in combination with the second feature map extracted by the first operation module at each stage to obtain the second target object mask, for the second operation module at the $m^{th}$ stage (m is a positive integer and is not greater than P), the step includes: a step S3021 to a step S3023.

At step S3021, by using the splicing layer of the second operation module at the present stage (i.e., the $m^{th}$ stage), splicing the second feature map with the first target object mask, or splicing the second feature map with a third feature map output by the second operation module at the previous stage, to generate a fourth feature map.

When m=1, that is, for the second operation module at the first stage, the splicing layer is used to splice the second feature map with the first target object mask; and when m is larger than 1, the splicing layer of the second operation module at the corresponding present stage is used to splice the second feature map with the third feature map output by the second operation module at the previous stage.

In some implementations, the number of the stages at which the first operation modules are arranged is the same as the number of stages at which the second operation modules are arranged.

In some implementations, the splicing layer is used to splice at the channel latitude.

At step S3022, performing, by using the third operation unit of the second operation module at the present stage, image feature extraction based on the fourth feature map, and generating a fifth feature map.

At step S3023, amplifying a size of the fifth feature map by using the fourth operation unit of the second operation module at the present stage, and outputting the amplified fifth feature map to the second operation module at the next stage.

The fifth feature map output by the second operation module at the present stage is the third feature map to be received by the second operation module at the next stage; and the second operation module at the last stage amplifies the fifth feature map and outputs the amplified fifth feature map as the second target object mask.

In some implementations, similar to the first operation module, the third operation unit includes a convolutional layer, a batch normalization layer, and an activating layer connected in sequence, and the fourth operation unit includes a transpose convolutional layer.

In some implementations, for the second operation modules at different stages, the parameter of each of the convolutional layer, the batch normalization layer, the activating layer and the transpose convolutional layer may be set differently.

The embodiment of the present disclosure provides the image processing method, which can be used for performing super-resolution processing on a mask corresponding to a target object in combination with the image features of a downsampled image, increasing feature dimensions of the mask, and improving the fineness of extracting the target object.

FIG. 4 is a flowchart of a method for training a mask super-resolution model according to an embodiment of the present disclosure. Specifically, the mask super-resolution model is the mask super-resolution model corresponding to FIG. 2, and includes a first sub-model and a second sub-model; as shown in FIG. 4, the mask super-resolution model is obtained by training through following steps S01 to S02.

At step S01, inputting the downsampled image sample and the target object mask sample corresponding to the downsampled image sample into the mask super-resolution model to be trained.

The downsampled image sample is obtained by downsampling an original image sample corresponding to the downsampled image sample, and the target object mask sample is obtained from the downsampled image sample by extracting the target object therefrom.

At step S02, training the mask super-resolution model to be trained based on the downsampled image sample and the target object mask sample in an iterative manner.

FIG. 5 is a flowchart illustrating a specific implementation of the step S02 according to an embodiment of the present disclosure. As shown in FIG. 5, the step S02 includes a step S021 and a step S022.

At step S021, extracting image features corresponding to the downsampled image sample by using the first sub-model to be trained, and performing super-resolution processing on the downsampled image sample.

At step S022, inputting the image features extracted by the first sub-model to be trained into a second sub-model to be trained, and performing super-resolution processing on the target object mask sample by using the second sub-model to be trained in combination with the image features extracted by the first sub-model to be trained.

Similar to the image features corresponding to the downsampled image, the image features corresponding to the downsampled image sample include the image features of the downsampled image sample and the image features of the feature map of the downsampled image sample; the processes of training the first sub-model and the second sub-model correspond to the actual reasoning processes of the first sub-model and the second sub-model.

At step S03, ending, in response to that a preset convergence condition is satisfied, the training and obtaining the mask super-resolution model.

In some implementations, the preset convergence condition includes at least one of: the training having been performed for preset iteration times, or a first loss value and a second loss value meeting a preset loss value condition.

The first loss value is calculated and obtained based on an original image sample corresponding to the downsampled image sample and the downsampled image sample subjected to the super-resolution processing, and the second loss value is calculated and obtained based on the original image sample and the target object mask sample subjected to the super-resolution processing.

In some implementations, after the step S021 of extracting, by using the first sub-model to be trained, image features corresponding to the downsampled image sample, and performing the super-resolution processing on the downsampled image sample, the method further includes a step of calculating to obtain the first loss value according to the original image sample and the downsampled image sample subjected to the super-resolution processing based on the Mean Square Error (MSE) function.

In some implementations, after the step S022 of performing super-resolution processing on the target object mask sample by using the second sub-model to be trained in combination with the image features extracted by the first sub-model to be trained, the method further includes steps of: acquiring a first edge map corresponding to the original image sample; performing an edge detection on the target object mask sample subjected to the super-resolution processing to obtain a second edge map; and performing edge matching on the first edge map and the second edge map, and determining the second loss value according to a result of the edge matching. In some implementations, the first edge map is obtained by performing the edge detection on the original image sample, or the first edge map that is calculated in advance is read from a memory area.

In some implementations, the second loss value $L_{EM}$ is calculated from the following formula:

$$L_{EM} = \frac{1}{n}\sum_{(x_i, y_i)}(EM1(x_i, y_i) - EM2(x_i, y_i)),$$

where, $EM1(x_i, y_i)$ represents a pixel value corresponding to pixel coordinates $(x_i, y_i)$ in the first edge map, and $EM2(x_i, y_i)$ represents a pixel value corresponding to pixel coordinates $(x_i, y_i)$ in the second edge map, $i \in [1, n]$; in some implementations, each edge map is an 8-bit grayscale image, $EM1(x_i, y_i) > 127$, and $EM2(x_i, y_i) > 127$.

FIG. 6 is a flowchart illustrating a specific implementation of the step S2 according to an embodiment of the present disclosure. As shown in FIG. 6, the step S2 of extracting the target object region from the downsampled image and obtaining the first target object mask includes a step S201.

At step S201, inputting the downsampled image into a target object extraction model obtained in advance by training, and extracting the target object region from the downsampled image by using the target object extraction model to obtain a first target object mask.

The target object extraction model is a UNet network model, and the resolution of an input image and the resolution of an output image of the target object extraction model are both 512×512; accordingly, in the step S1, the preset resolution is 512×512. Specifically, the first target object mask obtained by using the target object extraction model is input into the mask super-resolution model, the mask super-resolution model includes a first sub-model and a second sub-model, the first sub-model includes first operation modules, at three stages, sequentially connected, the second sub-model includes second operation modules, at three stages, sequentially connected, the provisions of layers in each of the first operation modules and the second operation modules are the same as those corresponding to the FIG. 3, therefore, the first operation modules at the three stages can be used to perform image feature extraction on the downsampled image for three times, and the second operation modules at the three stages perform the super-resolution processing on the first target object mask in combination with the image feature extracted each time.

In some implementations, the second operation module at each stage amplifies the size of the fifth feature map by using the fourth operation unit thereof, and on the basis of parameter settings of the corresponding model, the size of the fifth feature map can be amplified by two times each time, and the resolution of the second target object mask finally output may be 4096×4096, thereby being applicable to a 4K scene; specifically, the fifth feature map may be amplified by two times by setting the fill parameter (padding) of the transpose convolutional layer, for example, by setting the parameter to "same" or the like.

The following describes the image processing method provided in the embodiment of the present disclosure in detail with reference to practical applications. Specifically, by taking the application of portrait matting as an example, the target object region in the downsampled image is a portrait region, and the target object image finally obtained is a portrait image.

In a specific implementation, firstly, an original image is downsampled according to a preset resolution to generate a downsampled image; the original image is a 4K image including a portrait, and the preset resolution is 512×512.

The downsampled image is input into a target object extraction model obtained in advance by training, and the portrait region in the downsampled image is extracted by using the target object extraction model to obtain a first target object mask, where the target object extraction model is specifically used for portrait matting and is a UNet network model.

The downsampled image and the first target object mask are input into a mask super-resolution model obtained in advance by training; the mask super-resolution model includes a first sub-model and a second sub-model; the first sub-model includes first operation modules, at three stages (i.e., P=3), connected in sequence, the first operation module at each stage includes a first operation unit and a second operation unit, and the downsampled image is input into the first sub-model; the second sub-model includes second operation modules, at three stages, connected in sequence, the second operation module at each stage includes a splicing layer, a third operation unit and a fourth operation unit, where the first operation unit and the third operation unit at the same stage are connected through the splicing layer, and the first target object mask is input into the second sub-model. Specifically, for the first operation module at the $n^{th}$ stage (n is a positive integer and is not greater than 3), the first operation module at the $n^{th}$ stage extracts image features according to the downsampled image or the first feature map output by the first operation module at the previous stage by using the first operation unit thereof to generate a second feature map, and amplifies the size of the second feature map by using the second operation unit of the first operation module at the $n^{th}$ stage, and outputs the amplified second feature map to the first operation module at the next stage; where, for the first operation module at the first stage, the first operation unit directly extracts the image features of the downsampled image, and for the first operation modules at the second and third stages, the first operation units of the first operation modules at the second and third stages respectively extract the image features of feature maps output by the first operation module at the first stage and the first operation module at the second stage, the operation module at the third stage directly outputs the second feature map amplified, and the second feature map is the down-sampled image subjected to the super-resolution processing. In some implementations, the first operation unit includes a convolutional layer, a batch normalization layer, and an activating layer connected in sequence, and the second operation unit includes a transpose convolutional layer. Specifically, for the second operation module at the $m^{th}$ stage (m is a positive integer and not greater than 3), the second operation module at the $m^{th}$ stage uses the splicing layer thereof to splice the second feature map output by the first operation module at the same stage (i.e., the $m^{th}$ stage) with the first target object mask, or splice the second feature map with the third feature map output by the second operation module at the previous stage, to generate a fourth feature map; extracts image features according to the fourth feature map by using the third operation unit thereof to generate a fifth feature map; amplifies the size of the fifth feature map by using the fourth operation unit thereof, and outputs the amplified fifth feature map to the second operation module at the next stage, where, for the second operation module at the first stage, it splices the feature map output by the first operation module at the first stage with the first target object mask by using the splicing layer thereof, for the second operation modules at the second stage and third stage, the splicing layers thereof splice the feature map output by the second operation module at the first stage with the feature map output by the first operation module at the second stage, and splice the feature map output by the second operation module at the second stage with the feature map output by the first operation module at the third stage, respectively, and the operation module at the third stage amplifies the fifth feature map and directly outputs the amplified fifth feature map, and the amplified fifth feature map is the second target object mask; in some implementations, the third operation unit includes a convolutional layer, a batch normalization layer, and an activating layer connected in sequence, and the fourth operation unit includes a transpose convolutional layer.

Finally, the second target object mask and the original image are fused to obtain the portrait image.

Figure 7:
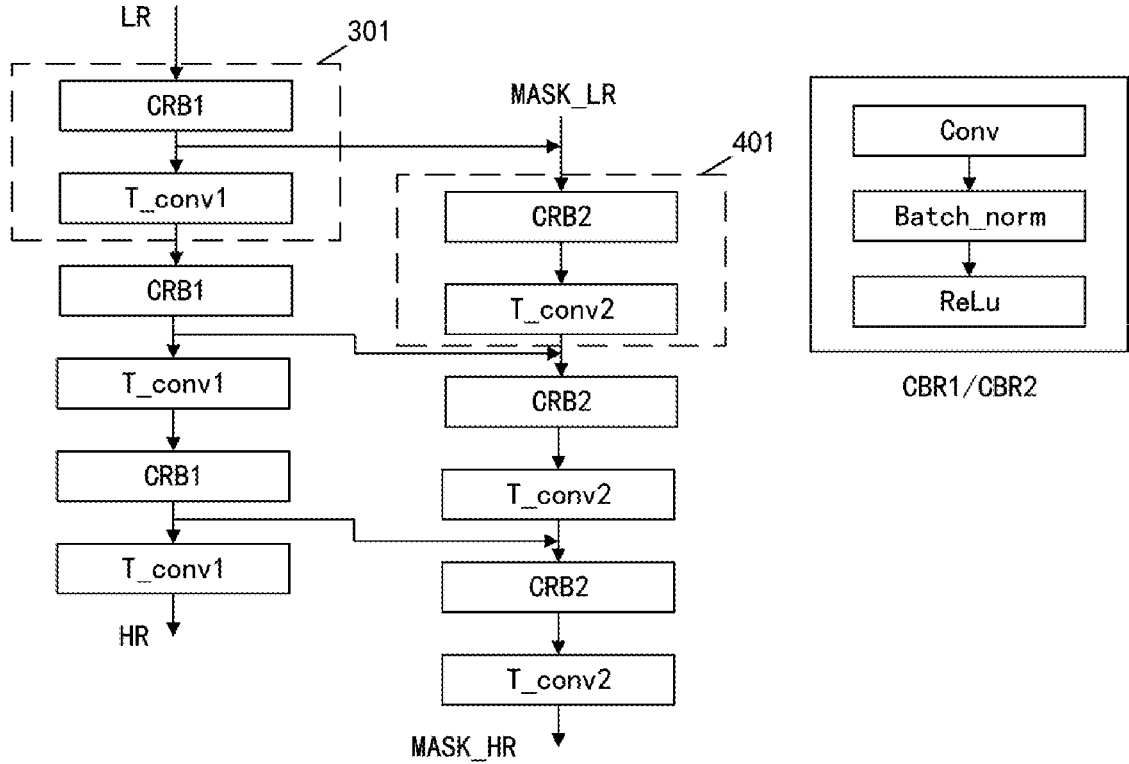
FIG. 7 is a schematic structural diagram of a mask super-resolution model according to an embodiment of the present disclosure.

FIG. 7 is a schematic structural diagram of a mask super-resolution model according to an embodiment of the present disclosure. As shown in FIG. 7, the arrows show a direction in which the data is transmitted; the mask super-resolution model includes a first sub-model and a second sub-model; the first sub-model includes first operation modules 301, at three stages, connected in sequence, the first operation module 301 at each stage includes a first operation unit CBR1 and a second operation unit T_conv1, a down-sampled image LR is input into the first sub-model, and the first sub-model outputs the downsampled image HR subjected to the super-resolution processing; the second sub-model includes second operation modules 401, at three stages, connected in sequence, the second operation module 401 at each stage includes a splicing layer (not shown in the figure), a third operation unit CBR2 and a fourth operation unit T_conv2, where the first operation unit CBR1 and the third operation unit CBR2 at the same stage are connected through the splicing layer, a first target object mask MASK_LR is input into the second sub-model, and the second sub-model outputs a second target object mask MASK_HR; arrangements of layers in the first operation unit CBR1 and the third operation unit CBR2 are similar, as shown in FIG. 7, they each include a convolutional layer Cony, a batch normalization layer Batch_norm, and an activating layer ReLu.

Figures 8, 9:
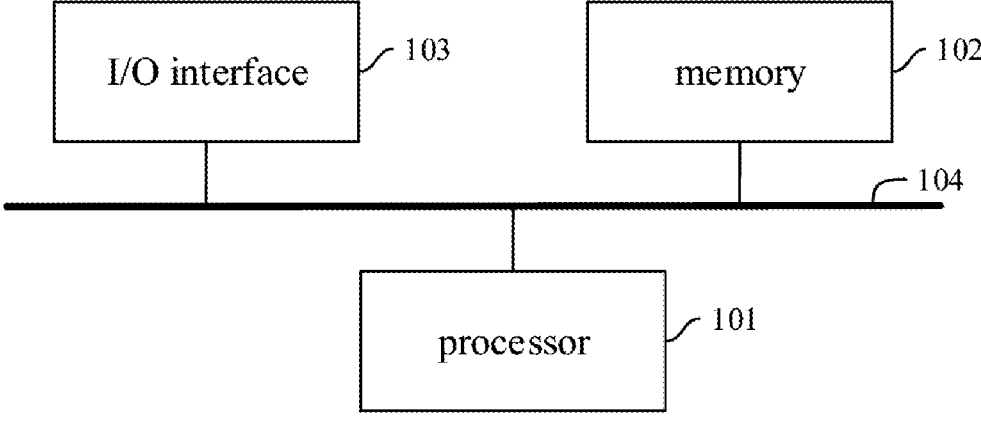
FIG. 8 is a block diagram of an electronic device according to an embodiment of the present disclosure.
FIG. 9 is a block diagram of a non-transitory computer readable medium according to an embodiment of the present disclosure.

FIG. 8 is a block diagram of an electronic device according to an embodiment of the present disclosure. As shown in FIG. 8, the electronic device includes: at least one processor 101; a memory 102 storing at least one program thereon, the at least one processor, when executed by the at least one processor 101, causes the at least one processor 101 to implement the image processing method in any embodiment described above; and at least one I/O interface 103 connected between the at least one processor and the memory, and configured to realize information interaction between the at least one processor and the memory.

The processor 101 is a device with data processing capability, which includes, but is not limited to, a Central Processing Unit (CPU) and the like; the memory 102 is a device having data storage capability, which includes, but not limited to, a random access memory (RAM, more specifically SDRAM, DDR and the like), a Read Only Memory (ROM), an Electrically Erasable Programmable Read Only Memory (EEPROM), a flash memory (FLASH); the I/O interface (read/write interface) 103 is connected between the processor 101 and the memory 102, and can realize information interaction between the processor 101 and the memory 102, and includes, but is not limited to, a data bus (Bus) and the like.

In some implementations, the processor 101, memory 102, and I/O interface 103 are interconnected via the bus 104, and then connected with other components of a computing device.

In some implementations, the processor 101 includes a plurality of graphics processors (GPUs) arranged in combination to form a graphics processor array.

FIG. 9 is a block diagram of a non-transitory computer readable medium according to an embodiment of the present disclosure. The non-transitory computer readable medium has stored thereon a computer program, where the computer program, when executed by a processor, causes the processor to implement the image processing method in any embodiment described above.

It will be understood by those of ordinary skill in the art that all or some of the steps of the methods disclosed above, functional modules/units in the device disclosed above may be implemented as software, firmware, hardware, or suitable combinations thereof. In a hardware implementation, the division of the functional modules/units mentioned in the above description does not necessarily correspond to division of physical components; for example, one physical component may have multiple functions, or one function or step may be performed by several physical components in cooperation. Some or all of the physical components may be implemented as software executed by a processor, such as a central processing unit, a digital signal processor, or a microprocessor, or as hardware, or as an integrated circuit, such as an application specific integrated circuit. Such software may be distributed on non-transitory computer readable medium, which may include a computer storage medium (or non-transitory medium) and a communication medium (or transitory medium). The term of computer storage medium includes volatile and nonvolatile, removable and non-removable medium implemented in any method or technology for storage of information such as computer readable instructions, data structures, program modules or other data, as is well known to those skilled in the art. The computer storage medium includes, but is not limited to, RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices, or any other medium which can be used to store the desired information and which can accessed by a computer. In addition, the communication medium typically embodies computer readable instructions, data structures, program modules or other data in a modulated data signal such as a carrier wave or a signal in other transport mechanism, and includes any information delivery medium as is well known to those skilled in the art.

Example embodiments have been disclosed herein, and although specific terms are employed, these terms are used and should be interpreted in a generic and descriptive sense only and not for purposes of limitation. In some instances, features, characteristics and/or elements described in connection with a particular embodiment may be used alone or in combination with features, characteristics and/or elements described in connection with other embodiments, unless expressly stated otherwise, as would be apparent to one skilled in the art. It will, therefore, be understood by those skilled in the art that various changes in form and details may be made therein without departing from the scope of the present disclosure as set forth in the appended claims.

What is claimed is:

1. An image processing method, comprising:
downsampling an original image according to a preset resolution to generate a downsampled image;
extracting a target object region from the downsampled image to obtain a first target object mask;
inputting the downsampled image and the first target object mask into a mask super-resolution model obtained in advance by training; performing super-resolution processing on the first target object mask by using the mask super-resolution model to obtain a second target object mask, wherein a resolution of the second target object mask is higher than that of the first target object mask; and
fusing the second target object mask with the original image to obtain a target object image, wherein
the mask super-resolution model comprises a first sub-model and a second sub-model;
the performing super-resolution processing on the first target object mask by using the mask super-resolution model to obtain a second target object mask comprises:
extracting image features corresponding to the downsampled image by using the first sub-model;
inputting the image features extracted by the first sub-model into the second sub-model; and performing the super-resolution processing on the first target object mask by using the second sub-model in combination with the image features extracted by the first sub-model to obtain the second target object mask;
wherein the first sub-model comprises first operation modules, at P stages, connected in sequence, the first operation module at each stage comprises a first operation unit and a second operation unit, wherein P is a positive integer greater than the extracting the image features corresponding to the downsampled image by using the first sub-model comprises:
for the first operation module at an nth stage, n being a positive integer and is not greater than P, extracting, by using the first operation unit, the image features according to the downsampled image or a first feature map output by the first operation module at the previous stage to generate a second feature map, and outputting the second feature map to the second sub-model: amplifying a size of the second feature map by using the second operation unit of the first operation module at the nth stage, and outputting the amplified second feature map to the first operation module at the next stage:
the performing the super-resolution processing on the first target object mask by using the second sub-model in combination with the image features extracted by the first sub-model to obtain the second target object mask comprises:
performing the super-resolution processing on the first target object mask by using the second sub-model in combination with the second feature map extracted by the first operation module at each stage to obtain the second target object mask; and
wherein the second sub-model comprises second operation modules, at P stages, connected in sequence, the second operation module at each stage comprises a splicing layer, a third operation unit and a fourth operation unit, wherein the first operation unit and the third operation unit at the same stage are connected through the splicing layer;
the performing the super-resolution processing on the first target object mask by using the second sub-model in combination with the second feature map extracted by the first operation module at each stage to obtain the second target object mask comprises:
for the second operation module at an mth stage, m being a positive integer and not greater than P, by using the splicing layer of the second operation module at the mth stage, splicing the second feature map with the first target object mask, or splicing the second feature map with a third feature map output by the second operation module at the previous stage, to generate a fourth feature map;
extracting, by using the third operation unit of the second operation module at the mth stage, the image features according to the fourth feature map to generate a fifth feature map;
amplifying a size of the fifth feature map by using the fourth operation unit of the second operation module at the mth stage, and outputting the amplified fifth feature map to the second operation module at the next stage;
wherein, for the second operation module at the last stage, the second operation module at the last stage outputs the amplified fifth feature map as the second target object mask.

2. The image processing method of claim 1, wherein the first operation unit comprises a convolutional layer, a batch normalization layer, and an activating layer connected in sequence, and the second operation unit comprises a transpose convolutional layer.

3. The image processing method of claim 1, wherein the third operation unit comprises a convolutional layer, a batch normalization layer, and an activating layer connected in sequence, and the fourth operation unit comprises a transpose convolutional layer.

4. The image processing method of claim 1, wherein the extracting the target object region from the downsampled image to obtain the first target object mask comprises:

inputting the downsampled image into a target object extraction model obtained in advance by training, and extracting the target object region from the down-sampled image by using the target object extraction model to obtain the first target object mask, wherein, the target object extraction model is a UNet network model, the first sub-model comprises first operation modules, at three stages, connected in sequence, and the second sub-model comprises second operation modules, at three stages, connected in sequence.

5. The image processing method of claim 1, wherein the mask super-resolution model is trained by:

inputting a downsampled image sample and a target object mask sample corresponding to the downsampled image sample into the mask super-resolution model to be trained;

training the mask super-resolution model to be trained based on the downsampled image sample and the target object mask sample in an iterative manner, through: extracting image features corresponding to the down-sampled image sample by using the first sub-model to be trained, and performing super-resolution processing on the downsampled image sample; inputting the image features extracted by the first sub-model to be trained into the second sub-model to be trained; and performing super-resolution processing on the target object mask sample by using the second sub-model to be trained in combination with the image features extracted by the first sub-model to be trained; and ending, in response to that a preset convergence condition is satisfied, the training and obtaining the mask super-resolution model.

6. The image processing method of claim 5, wherein the preset convergence condition comprises at least one of:

the training having been trained for preset iteration times; or a first loss value and a second loss value meeting a preset loss value condition, wherein the first loss value is calculated and obtained based on an original image sample corresponding to the downsampled image sample and the downsampled image sample subjected to the super-resolution processing, and the second loss value is calculated and obtained based on the original image sample and the target object mask sample subjected to the super-resolution processing.

7. The image processing method of claim 6, further comprising: after the extracting image features corresponding to the downsampled image sample by using the first sub-model to be trained, and performing super-resolution processing on the downsampled image sample, calculating to obtain the first loss value according to the original image sample and the downsampled image sample subjected to the super-resolution processing based on a Mean Square Error function.

8. The image processing method of claim 6, further comprising: after the performing super-resolution processing on the target object mask sample by using the second sub-model to be trained in combination with the image features extracted by the first sub-model to be trained, acquiring a first edge map corresponding to the original image sample;

performing an edge detection on the target object mask sample subjected to the super-resolution processing to obtain a second edge map; and performing edge matching on the first edge map and the second edge map, and determining the second loss value according to a result of the edge matching.

9. The image processing method of claim 1, wherein the target object region is a portrait region, and the target object image is a portrait image.

10. An electronic device, comprising:

at least one processor;

a memory configured to store at least one program, wherein the at least one program, when executed by the at least one processor, causes the at least one processor to execute a process comprising:

downsampling an original image according to a preset resolution to generate a downsampled image;

extracting a target object region from the downsampled image to obtain a first target object mask;

inputting the downsampled image and the first target object mask into a mask super-resolution model obtained in advance by training; performing super-resolution processing on the first target object mask by using the mask super-resolution model to obtain a second target object mask, wherein a resolution of the second target object mask is higher than that of the first target object mask; and fusing the second target object mask with the original image to obtain a target object image, wherein the mask super-resolution model comprises a first sub-model and a second sub-model;

the performing super-resolution processing on the first target object mask by using the mask super-resolution model to obtain a second target object mask comprises:

extracting image features corresponding to the down-sampled image by using the first sub-model;

inputting the image features extracted by the first sub-model into the second sub-model; and performing the super-resolution processing on the first target object mask by using the second sub-model in combination with the image features extracted by the first sub-model to obtain the second target object mask;

wherein the first sub-model comprises first operation modules, at P stages, connected in sequence, the first operation module at each stage comprises a first operation unit and a second operation unit, wherein P is a positive integer greater than the extracting the image features corresponding to the downsampled image by using the first sub-model comprises:

for the first operation module at an nth stage, n being a positive integer and is not greater than P, extracting, by using the first operation unit, the image features according to the downsampled image or a first feature map output by the first operation module at the previous stage to generate a second feature map, and outputting the second feature map to the second sub-model: ampli-fying a size of the second feature map by using the second operation unit of the first operation module at the nth stage, and outputting the amplified second feature map to the first operation module at the next stage;

the performing the super-resolution processing on the first target object mask by using the second sub-model in combination with the image features extracted by the first sub-model to obtain the second target object mask comprises:

performing the super-resolution processing on the first target object mask by using the second sub-model in combination with the second feature map extracted by the first operation module at each stage to obtain the second target object mask; and wherein the second sub-model comprises second operation modules, at P stages, connected in sequence, the second operation module at each stage comprises a splicing layer, a third operation unit and a fourth operation unit, wherein the first operation unit and the third operation unit at the same stage are connected through the splicing layer;

the performing the super-resolution processing on the first target object mask by using the second sub-model in combination with the second feature map extracted by the first operation module at each stage to obtain the second target object mask comprises:

for the second operation module at an mth stage, m being a positive integer and not greater than P, by using the splicing layer of the second operation module at the mth stage, splicing the second feature map with the first target object mask, or splicing the second feature map with a third feature map output by the second operation module at the previous stage, to generate a fourth feature map; extracting, by using the third operation unit of the second operation module at the mth stage, the image features according to the fourth feature map to generate a fifth feature map;

amplifying a size of the fifth feature map by using the fourth operation unit of the second operation module at the mth stage, and outputting the amplified fifth feature map to the second operation module at the next stage;

wherein, for the second operation module at the last stage, the second operation module at the last stage outputs the amplified fifth feature map as the second target object mask.

11. A non-transitory computer readable medium, storing a computer program thereon, the computer program, when executed by a processor, causes the processor to execute a process comprising:

downsampling an original image according to a preset resolution to generate a downsampled image;

extracting a target object region from the downsampled image to obtain a first target object mask;

inputting the downsampled image and the first target object mask into a mask super-resolution model obtained in advance by training; performing super-resolution processing on the first target object mask by using the mask super-resolution model to obtain a second target object mask, wherein a resolution of the second target object mask is higher than that of the first target object mask; and fusing the second target object mask with the original image to obtain a target object image, wherein the mask super-resolution model comprises a first sub-model and a second sub-model;

the performing super-resolution processing on the first target object mask by using the mask super-resolution model to obtain a second target object mask comprises:

extracting image features corresponding to the downsampled image by using the first sub-model;

inputting the image features extracted by the first sub-model into the second sub-model; and performing the super-resolution processing on the first target object mask by using the second sub-model in combination with the image features extracted by the first sub-model to obtain the second target object mask;

wherein the first sub-model comprises first operation modules, at P stages, connected in sequence, the first operation module at each stage comprises a first operation unit and a second operation unit, wherein P is a positive integer greater than the extracting the image features corresponding to the downsampled image by using the first sub-model comprises:

for the first operation module at an nth stage, n being a positive integer and is not greater than P, extracting, by using the first operation unit, the image features according to the downsampled image or a first feature map output by the first operation module at the previous stage to generate a second feature map, and outputting the second feature map to the second sub-model: amplifying a size of the second feature map by using the second operation unit of the first operation module at the nth stage, and outputting the amplified second feature map to the first operation module at the next stage;

the performing the super-resolution processing on the first target object mask by using the second sub-model in combination with the image features extracted by the first sub-model to obtain the second target object mask comprises:

performing the super-resolution processing on the first target object mask by using the second sub-model in combination with the second feature map extracted by the first operation module at each stage to obtain the second target object mask; and wherein the second sub-model comprises second operation modules, at P stages, connected in sequence, the second operation module at each stage comprises a splicing layer, a third operation unit and a fourth operation unit, wherein the first operation unit and the third operation unit at the same stage are connected through the splicing layer;

the performing the super-resolution processing on the first target object mask by using the second sub-model in combination with the second feature map extracted by the first operation module at each stage to obtain the second target object mask comprises:

for the second operation module at an mth stage, m being a positive integer and not greater than P, by using the splicing layer of the second operation module at the mth stage, splicing the second feature map with the first target object mask, or splicing the second feature map with a third feature map output by the second operation module at the previous stage, to generate a fourth feature map; extracting, by using the third operation unit of the second operation module at the mth stage, the image features according to the fourth feature map to generate a fifth feature map;

amplifying a size of the fifth feature map by using the fourth operation unit of the second operation module at the mth stage, and outputting the amplified fifth feature map to the second operation module at the next stage;

wherein, for the second operation module at the last stage, the second operation module at the last stage outputs the amplified fifth feature map as the second target object mask.

* * * * *